May 24, 1966  R. L. COLLINS  3,252,342

WHEEL CYLINDER MECHANISM

Filed June 26, 1964

INVENTOR.
Richard L. Collins
BY
D. D. McGraw
ATTORNEY

United States Patent Office 3,252,342
Patented May 24, 1966

3,252,342
WHEEL CYLINDER MECHANISM
Richard L. Collins, Vandalia, Ohio, assignor to General Motors Corporation, Detroit, Mich., a corporation of Delaware
Filed June 26, 1964, Ser. No. 378,319
15 Claims. (Cl. 74—18.2)

The invention relates to wheel cylinder mechanisms and the like, and particularly to wheel cylinder mechanisms having internal cylinder boot constructions. The invention is an improvement to the internal wheel cylinder boot arrangements disclosed in United States patent application Serial No. 238,503, entitled, "Wheel Cylinder Assembly and Method of Manufacture," and filed November 19, 1962, now Patent No. 3,187,848, by Ronald L. Shellhause et al., and United States patent application Serial No. 353,035, entitled, "Cylinder Boot," and filed March 19, 1964, by Ronald L. Shellhause et al. The invention particularly relates to means for retaining an internal wheel cylinder boot in a wheel cylinder body, and a wheel cylinder or servomotor assembly utilizing such retaining means.

The provision of a wheel cylinder assembly wherein the boot is received internally of the end of the wheel cylinder has proven to be very advantageous in that it virtually eliminates damage to the wheel cylinder boot during various handling operations prior to being assembled in a wheel brake, provides for better radiant heat dissipation while the brakes are operating, provides an assembly occupying less space than wheel cylinder assemblies utilizing external boots of the type in common usage for many years, and permits a reduction in the amount of material required for the manufacture of the boots. As more fully disclosed and claimed in the applications referred to above, the disclosures of which are fully incorporated herein by reference, the internal wheel cylinder boot may be retained in the ends of wheel cylinders by friction and cohesive forces and mechanical locking engagement obtained by flowing the wheel cylinder boot material into the engaged surface of the wheel cylinder. It has been found that in some installations it is undesirable to use or depend entirely upon such retention of the wheel cylinder boot. Also, field service repairs may be somewhat complicated since the boot tends to be more tightly retained in position after usage than after initial installation. Furthermore, dimensional control of the boot and the wheel cylinder surfaces may at times require manufacturing operations which are undesirable.

It is now proposed to provide an internal wheel cylinder boot with retaining means which will positively lock the boot axially in position in the end of the wheel cylinder. It is also proposed to provide retaining means which will resiliently urge the wheel boot radially outward into sealing and retention engagement with the wheel cylinder inner wall. It is further proposed to provide radially reducible retaining means for easy installation of the wheel cylinder boot and retaining means in the wheel cylinder, after which the retaining means acts under expanding spring load to sealingly engage the wheel cylinder boot with the wheel cylinder. The construction may be also utilized in other servomotor arrangements utilizing similar internal cylinder seal end and closing arrangements.

Figure 1:
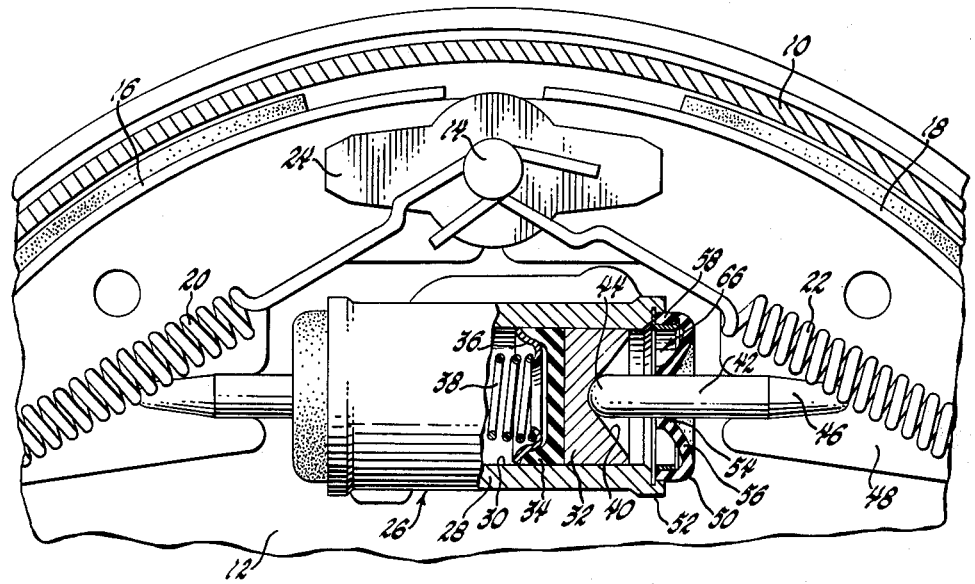
FIGURE 1 is a view of a portion of a wheel brake assembly embodying the invention and having parts broken away and in section.

The wheel cylinder assembly may be of any suitable type and is illustrated in the drawing as one of the duo-servo type. It includes a drum 10 which is rotatable and to which the wheel is attached. A backing plate 12 is suitably attached to the vehicle. An anchor pin 14 is secured to the backing plate to receive and transmit the braking force from shoes 16 and 18 to the vehicle through the backing plate. Shoes 16 and 18 are movably mounted on the backing plate in the usual manner so that they are movable into and out of braking engagement with the drum 10. Suitable retractor springs 20 and 22 are secured to the anchor pin 14 and the shoes 16 and 18 in the usual manner so that they perform their usual functions, including retention of the guide plate 24 in place on the anchor pin.

The wheel cylinder assembly 26 is secured to the backing plate 12 in force-transmitting relationship in any suitable manner. The particular wheel cylinder assembly illustrated includes a cylinder body 28 in which a cylinder or bore 30 is formed. Cylinder 30 is smoothly finished by suitable operations such as honing, as is well known to those skilled in the art. Only half of the interior of the wheel cylinder assembly 26 is illustrated in section since the other end of the assembly is substantially identical thereto but in reverse relation. It is understood that the invention is also applicable to other types of wheel cylinder construction than those required for duo-servo brakes. A wheel cylinder piston 32 is received in the cylinder or bore 30 and a cup seal 34 engages the inner surface of the piston and is retained in position against the piston by spring seat 36 and spring 38. Piston 32 is suitably recessed as at 40 to receive link pin 42 so that the link pin end 44 remains substantially on the center line of the wheel cylinder. Link pin 42 extends out of the wheel cylinder so that its other end 46 engages the web 48 of the shoe 18 in force-transmitting relation. This portion of the structure is conventional except for the ends of the cylinder body 28, one of which is described below in greater detail.

The wheel cylinder boot 50 is inserted in the end 52 of the cylinder body 28 and is provided with an annular inner seal section 54 which is in sealing engagement with the link pin 42. An intermediate body section 56 extends from the inner seal section 54 to the outer boot peripheral section 58. The outer boot peripheral section 58 is projected radially outward of the inner seal section 54 and is formed as an annular cylindrical section having an outer surface 60, an inner surface 62, and an end surface 64. The wheel cylinder boot is made of any suitable flexible material such as rubber, neoprene, styrene butadiene, or any elastomeric material having similar characteristics. Any material used must not be adversely affected by the hydraulic brake fluid utilized. It must be able to withstand temperatures normally found in the wheel cylinder portion of the brake assembly without melting, cracking or otherwise failing. It must be sufficiently flexible to permit inner seal section 54 to move with pivotal movement of the link pin 42 without being permanently damaged.

Figure 3:
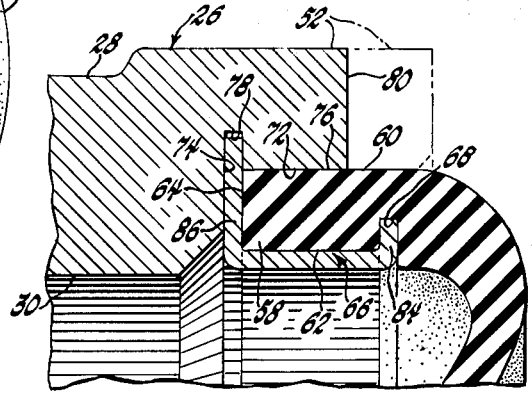
FIGURE 3 is an enlarged partial view having parts broken away and in section and showing the wheel cylinder boot as retained in the end of the wheel cylinder.

The boot 50 is provided with retainer means 66. The boot may be formed with a shallow recess of which the boot inner surface 62 is the bottom, although such a recess construction is not normally necessary. In the preferred configuration illustrated, an annular internal groove 68 is formed in the boot inner surface 62 in axially spaced relation to the boot end surface 64. The recess 72 formed in the end 52 of the wheel cylinder preferably has a greater internal diameter than the bore 30 so that a shoulder 74 is provided. The surface 76, which is the bottom of the recess 72, may have a control finish provided with a predetermined roughness in accordance with the above noted applications, although this is not necessary to provide a satisfactory seal when the retaining means embodying the invention herein claimed is utilized. When relying primarily upon the friction and cohesive interaction of the wheel cylinder body and the boot to retain the boot in place, the cylinder body end 52 preferably extends outwardly over the boot to the extent shown by dashed lines in FIGURE 3. While this construction may still be utilized in wheel cylinder assemblies embodying the invention herein disclosed and claimed, it is not normally necessary to locate the end surface 80 of the cylinder body end 52 as far from the shoulder 74. This permits shortening the overall length of the wheel cylinder body, therefore aiding brake construction having close clearance conditions in the area of the wheel cylinder in the brake shoe web. An internal groove 78 is provided in body 28, and is preferably so formed that the shoulder 74 extends radially outward to provide one side of the groove. Groove 78 extends radially outward beyond the recess surface 72.

Figure 2:
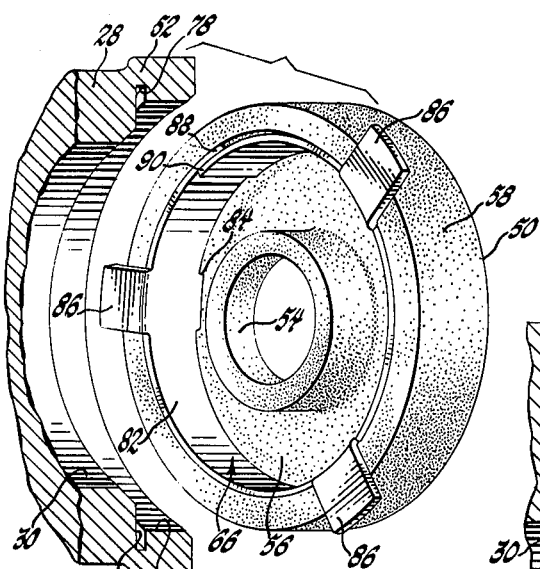
FIGURE 2 is a perspective view of a wheel cylinder and boot in position just prior to installation of the boot in the cylinder, with parts broken away and in section.
Figure 4:
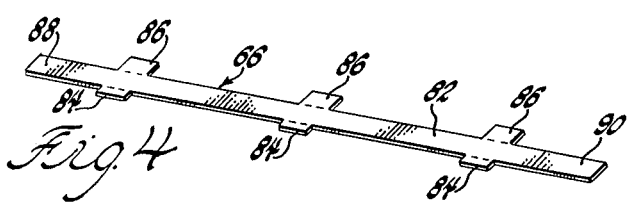
FIGURE 4 is a view of retaining means embodying the invention in its free form.

The retaining means 66 may be formed from a spring strip in the manner indicated in FIGURE 4 in its free form. The retaining means 66 includes a strip body 82. Gripping or locking means such as tabs 84 and 86 are provided in spaced positions on either side of strip body 82 so that when the strip is placed in any annular conformation inside the wheel cylinder boot 50, the tabs 84 are formed on one axial end of the retaining means and the tabs 86 are formed on the other axial end of the retaining means. The tabs are preferably bent to extend in a radial outward direction. Several tabs 84 may be provided, as well as several tabs 86. In the illustration in the drawing, three of each such tabs are provided. More or less tabs may be provided, depending upon the particular requirements. It has been found, however, that three tabs which are spaced circumferentially approximately 120° apart when the retaining means is installed are usually sufficient. Other gripping, locking or anchor means may be provided as part of retaining means 66 without departing from the scope of the invention so long as a firm and preferably positive gripping action of the retaining means to the boot and to the cylinder body is obtained. When utilizing tabs 84 and 86 as the gripping or locking means, tabs 84 are fitted in groove 68. The strip body 82 is of sufficient length to have the retaining means ends 88 and 90 adjacent each other and preferably in an overlapping arrangement as particularly shown in FIGURE 2. Retaining means ends 88 and 90 are preferably movable relative to each other so that the retaining means in its annular configuration is radially reducible and expandable, with the spring characteristic of the material of which means 66 is formed urging the retaining means to the expanded condition. Thus as the retaining means 66 is radially reduced, its circumference is reduced, and when it expands radially, its circumference is expanded. The distance between axially spaced tabs 84 and 86 is preferably substantially the same as the distance between end surface 64 of the boot and the adjacent side surface of the groove 68. A tight fit may be utilized to assist in holding the retaining means in place in the boot. However, the fit must not be so tight as to prevent the radially expanding action of the retaining means after it is installed. When retaining means 66 is installed in the boot 50, tabs 86 extend along the boot end surface 64 and radially beyond the boot outer peripheral section 58 so that they engage groove 78 to prevent relative axial movement of the boot and the wheel cylinder body.

The installation of the boot may be accomplished by inserting the retaining means 66 in boot 50, with tabs 84 in recess 68, gripping the outside boot surface 60, compressing the boot and the retaining means slightly while inserting the boot into the wheel cylinder body until tabs 86 abut shoulder 74, and then releasing the boot and the retaining means so that the resilient spring-like action of the retaining means, and to some extent of the boot outer peripheral section 58, moves the tabs 86 into groove 78. This spring force also urges the boot outer peripheral surface 60 into engagement with recess surface 76 and holds the surface in a closed and sealed relation. This installation may be accomplished with a suitable tool for gripping and releasing the boot. The installation may also be made without requiring a boot lubricant. The boot may be removed in a generally similar manner for inspection or repair of the wheel cylinder, or for replacement of the boot.

I claim:

1. A wheel cylinder assembly comprising a cylinder body having a cylinder formed therein with an internal annular surface at a cylinder end, an internal annular groove formed in said body internal annular surface, a wheel cylinder boot having an outer peripheral surface in sealing engagement with said body annular internal surface and an inner peripheral surface with an annular internal groove formed therein, and boot retaining means lockingly engaging said grooves.

2. A wheel cylinder assembly comprising a cylinder body having a cylinder formed therein with an internal annular surface at a cylinder end, an internal annular groove formed in said body internal annular surface, a wheel cylinder boot having an outer peripheral surface in sealing engagement with said body annular internal surface and an inner peripheral surface with an annular internal groove formed therein, and boot retaining means having a resiliently expandable body engaging said boot inner peripheral surface and urging said boot outer peripheral surface into sealing engagement with said body internal annular surface and anchor means engaging said grooves and holding said boot in said cylinder.

3. The assembly of claim 2, said boot retaining means comprising an annularly formed spring strip having overlapping and circumferentially relatively movable ends, said boot and said retaining means being radially reducible for installation and expanding for sealing and retention of said boot in said cylinder.

4. In combination, a cylindrical body having an open end and means removably sealing said open end and fitting internally of said body open end and means engaging said body and said sealing means and retaining said sealing means in said open end, said retaining means being radially and circumferentially flexible and spring-expandible means engaging said sealing means and urging said sealing means radially outward into sealing engagement with said cylinder end.

5. The combination of claim 4, said retaining means having gripping means positively engaging said body and said sealing means internally of said body and holding said sealing means in said body against axial movement relative to said body.

6. A wheel cylinder assembly having a cylinder, an internal wheel cylinder boot, and holding means secured to said boot internally of said boot and secured to said cylinder internally of said cylinder and holding said boot in said cylinder, said holding means comprising radially flexible and spring-expandible means.

7. A wheel cylinder assembly having a cylinder, an internal wheel cylinder boot, and holding means secured to said boot internally of said boot and secured to said cylinder internally of said cylinder and holding said boot in said cylinder, said holding means comprising an annularly formed spring strip having free adjacent ends and circumferentially expandible and contractible and spring loaded urging said boot radially outward into sealing engagement with said cylinder.

8. A wheel cylinder assembly having a cylinder, an internal wheel cylinder boot, and holding means secured to said boot internally of said boot and secured to said cylinder internally of said cylinder and holding said boot in said cylinder, said holding means having radially outwardly extending tabs formed on opposite axial sides thereof, and a first groove formed in said boot and a second groove formed in said cylinder, the tabs on one axial side of said holding means being received in said boot groove and the tabs on the other axial side of said holding means being received in said cylinder groove.

9. A wheel cylinder assembly comprising: a wheel cylinder with internal groove means formed therein adjacent one end; an internal wheel cylinder boot having a cylindrical portion with internal groove means formed therein; and boot holding means comprising, a spring strip body annularly formed to have adjacent relatively movable ends, radially outwardly extending groove means engaging means formed on opposite axial ends thereof and said body being resiliently flexible radially and spring-expandible radially and circumferentially and engaging said boot cylindrical portion internally thereof urging said boot radially outward into sealing engagement with said cylinder; said groove means engaging means on one axial end of said holding means being received in said boot groove means, and said groove means engaging means on the other axial end of said holding means being received in said cylinder groove means thereby preventing axial relative movement of said boot and said cylinder.

10. A fluid pressure servomotor having a body with a cylinder formed therein and having at least one open end, a boot sealingly closing said cylinder open end and having an annular peripheral portion thereof mounted internally of said cylinder in sealing relation therewith, and retaining means secured to said boot annular peripheral portion and said body within said cylinder and mechanically holding said boot in said cylinder, said retaining means being a spring-expandible annularly formed strip having means formed thereon positively gripping said cylinder and said boot.

11. The servomotor of claim 10, said spring strip having free adjacent ends in overlapping relation permitting the strip to be radially reducible for installation and removal of said boot and said retaining means relative to said cylinder.

12. In a wheel cylinder assembly and the like having a cylinder formed in a cylinder body and an internal cylinder boot having the outer periphery received within said cylinder and sealingly closing said cylinder, a flexible retainer comprising a resilient spring strip annularly disposed with circumferentially adjacent ends and having means formed thereon internally gripping said cylinder body and said boot and holding said boot in position in said cylinder.

13. In a brake wheel cylinder assembly, a body having a cylinder formed therein, fluid pressure responsive brake apply means operable therein, brake force transmitting means extending from said brake apply means outwardly of said cylinder for actuating brake means, annular wheel cylinder boot means received about said force transmitting means and having the outer periphery thereof received within said cylinder, said body having recess means formed in the wall of said cylinder adjacent said boot means, and wheel cylinder boot means retaining means secured to said boot means and secured to said body by said recess means and holding said boot means in said cylinder.

14. An internal wheel cylinder boot securing device for securing a boot internally of the end of a wheel cylinder, said device comprising a spring strip annularly formed in spring expanding relation and having circumferentially adjacent overlapping free ends permitting radial increase and decrease of said device under controlled radial pressure, and gripping means formed thereon for gripping and holding the boot to the wheel cylinder, said spring strip gripping means being tabs formed on opposite sides thereof and bent to extend radially thereof when said strip is annularly formed.

15. In combination, a first annular member and a second annular member secured internally of said first annular member, and expanding ring securing means securing said members together and having a radially and circumferentially flexible body and means on said body engaging and positively gripping said annular members in securing relation.

References Cited by the Examiner
UNITED STATES PATENTS 2,249,141 5/1941 Johnson.
2,750,746 6/1956 Brannen _____ 74—18.2 X
2,976,420 3/1961 Landsverk et al.

MILTON KAUFMAN, *Primary Examiner.*